(12) United States Patent
Peterson et al.

(10) Patent No.: US 7,949,417 B2
(45) Date of Patent: May 24, 2011

(54) MODEL PREDICTIVE CONTROLLER SOLUTION ANALYSIS PROCESS

(75) Inventors: Tod J. Peterson, Herndon, VA (US); Adi R. Punuru, Oak Hill, VA (US); Kenneth F. Emigholz, Chevy Chase, MD (US); Robert K. Wang, Vienna, VA (US); Dave Barrett-Payton, Arlington, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 352 days.

(21) Appl. No.: 11/525,221

(22) Filed: Sep. 22, 2006

(65) Prior Publication Data

US 2008/0077257 A1 Mar. 27, 2008

(51) Int. Cl.
*G05B 13/02* (2006.01)
(52) U.S. Cl. ............... 700/44; 700/28; 700/33; 700/34; 700/36; 700/53
(58) Field of Classification Search .................... 700/44, 700/53, 28, 36, 33, 34
See application file for complete search history.

(56) References Cited

U.S. PATENT DOCUMENTS

| | | | |
|---|---|---|---|
| 4,197,576 A | 4/1980 | Sanchez | |
| 4,358,822 A | 11/1982 | Sanchez | |
| 4,736,316 A * | 4/1988 | Wallman | 700/29 |
| 4,937,763 A | 6/1990 | Mott | |
| 5,043,863 A | 8/1991 | Bristol et al. | |
| 5,144,549 A | 9/1992 | Youcef-Toumi | |
| 5,260,865 A | 11/1993 | Beauford et al. | |
| 5,301,101 A | 4/1994 | Macarthur et al. | |
| 5,343,407 A | 8/1994 | Beauford et al. | |
| 5,351,184 A | 9/1994 | Lu et al. | |
| 5,396,416 A | 3/1995 | Berkowitz et al. | |
| 5,457,625 A | 10/1995 | Lim et al. | |
| 5,519,605 A | 5/1996 | Cawlfield | |
| 5,541,833 A | 7/1996 | Bristol et al. | |
| 5,566,065 A | 10/1996 | Hansen et al. | |
| 5,568,378 A | 10/1996 | Wojsznis | |
| 5,570,282 A | 10/1996 | Hansen et al. | |
| 5,740,033 A | 4/1998 | Wassick et al. | |
| 5,758,047 A | 5/1998 | Lu et al. | |
| 5,781,432 A | 7/1998 | Keeler et al. | |
| 5,825,646 A | 10/1998 | Keeler et al. | |
| 5,920,478 A | 7/1999 | Ekblad et al. | |
| 5,933,345 A | 8/1999 | Martin et al. | |
| 6,047,221 A | 4/2000 | Piche et al. | |

(Continued)

FOREIGN PATENT DOCUMENTS

EP 0037579 B1 8/1986

(Continued)

OTHER PUBLICATIONS

Froisy-J.B., "Model Predictive Control- Building a Bridge Between Theory and Practice" Jul. 25, 2006, Scientific Direct p. 1426-1435.*

(Continued)

*Primary Examiner* — Albert Decady
*Assistant Examiner* — Thomas H Stevens

(57) ABSTRACT

The solution from a multivariable predictive controller (MPC) is analyzed and described by providing quantitative input to operators regarding the effect of changing controller limits on the MPC controller solution. This information allows a rapid operator response to changes and more optimal process operation.

31 Claims, 1 Drawing Sheet

U.S. PATENT DOCUMENTS

| | | |
|---|---|---|
| 6,056,781 A | 5/2000 | Wassick et al. |
| 6,064,809 A | 5/2000 | Braatz et al. |
| 6,122,555 A | 9/2000 | Lu |
| 6,207,936 B1 | 3/2001 | de Waard et al. |
| 6,216,048 B1 | 4/2001 | Keeler et al. |
| 6,253,113 B1 | 6/2001 | Lu |
| 6,278,899 B1 | 8/2001 | Piche et al. |
| 6,347,254 B1 | 2/2002 | Lu |
| 6,356,857 B1 | 3/2002 | Qin et al. |
| 6,373,033 B1 | 4/2002 | de Waard et al. |
| 6,381,504 B1 | 4/2002 | Havener et al. |
| 6,421,570 B1 | 7/2002 | McLaughlin et al. |
| 6,421,575 B1 | 7/2002 | Shakespeare |
| 6,438,430 B1 | 8/2002 | Martin et al. |
| 6,445,963 B1 | 9/2002 | Blevins et al. |
| 6,453,308 B1 | 9/2002 | Zhao et al. |
| 6,487,459 B1 | 11/2002 | Martin et al. |
| 6,493,596 B1 | 12/2002 | Martin et al. |
| 6,542,782 B1 | 4/2003 | Lu |
| 6,577,323 B1 | 6/2003 | Jamieson et al. |
| 6,587,108 B1 | 7/2003 | Guerlain et al. |
| 6,594,620 B1 | 7/2003 | Qin et al. |
| 6,615,090 B1 * | 9/2003 | Blevins et al. .................. 700/26 |
| 6,625,501 B2 | 9/2003 | Martin et al. |
| 6,650,947 B2 | 11/2003 | Fu et al. |
| 6,697,767 B2 | 2/2004 | Wang et al. |
| 6,718,234 B1 | 4/2004 | Demoro et al. |
| 6,721,609 B1 | 4/2004 | Wojsznis et al. |
| 6,725,103 B2 * | 4/2004 | Shigemasa et al. ............. 700/53 |
| 6,735,483 B2 | 5/2004 | Martin et al. |
| 6,738,677 B2 | 5/2004 | Martin et al. |
| 6,760,716 B1 | 7/2004 | Ganesamoorthi et al. |
| 6,807,510 B1 | 10/2004 | Backstrom et al. |
| 6,819,964 B2 | 11/2004 | Harmse |
| 6,839,599 B2 | 1/2005 | Martin et al. |
| 6,882,889 B2 | 4/2005 | Fuller et al. |
| 6,901,300 B2 | 5/2005 | Blevins et al. |
| 6,901,560 B1 | 5/2005 | Guerlain et al. |
| 6,936,665 B2 | 8/2005 | Stephens et al. |
| 6,950,711 B2 | 9/2005 | Havener et al. |
| 6,952,808 B1 | 10/2005 | Jamieson et al. |
| 7,024,252 B2 | 4/2006 | Martin et al. |
| 7,039,475 B2 | 5/2006 | Sayyarrodsari et al. |
| 7,047,089 B2 | 5/2006 | Martin et al. |
| 7,050,863 B2 | 5/2006 | Mehta et al. |
| 7,050,866 B2 | 5/2006 | Martin et al. |
| 7,058,617 B1 | 6/2006 | Hartman et al. |
| 7,065,511 B2 | 6/2006 | Zhao et al. |
| 7,110,834 B2 | 9/2006 | Martin et al. |
| 7,139,619 B2 | 11/2006 | Martin et al. |
| 7,149,590 B2 | 12/2006 | Martin et al. |
| 7,152,023 B2 | 12/2006 | Das |
| 7,184,845 B2 | 2/2007 | Sayyarrodsari et al. |
| 7,187,990 B2 | 3/2007 | Jang et al. |
| 7,197,485 B2 | 3/2007 | Fuller |
| 7,204,101 B2 | 4/2007 | Seiver et al. |
| 7,209,793 B2 | 4/2007 | Harmse et al. |
| 7,213,006 B2 | 5/2007 | Hartman et al. |
| 7,257,501 B2 | 8/2007 | Zhan et al. |
| 7,272,454 B2 | 9/2007 | Wojsznis et al. |
| 7,315,846 B2 | 1/2008 | Hartman et al. |
| 7,330,767 B2 * | 2/2008 | Thiele et al. .................. 700/29 |
| 7,330,804 B2 | 2/2008 | Turner et al. |
| 7,337,022 B2 * | 2/2008 | Wojsznis et al. ................ 700/36 |
| 7,376,471 B2 | 5/2008 | Das et al. |
| 7,376,472 B2 | 5/2008 | Wojsznis et al. |
| 2002/0072828 A1 | 6/2002 | Turner et al. |
| 2002/0099724 A1 | 7/2002 | Harmse |
| 2002/0111758 A1 | 8/2002 | Wang et al. |
| 2002/0176648 A1 | 11/2002 | Bhat et al. |
| 2002/0177908 A1 | 11/2002 | Bhat et al. |
| 2002/0177909 A1 | 11/2002 | Fu et al. |
| 2002/0178133 A1 | 11/2002 | Zhao et al. |
| 2003/0014131 A1 | 1/2003 | Havener et al. |
| 2003/0018399 A1 | 1/2003 | Havener et al. |
| 2003/0028265 A1 | 2/2003 | Martin |
| 2003/0065410 A1 | 4/2003 | Martin et al. |
| 2003/0073787 A1 | 4/2003 | Stephens et al. |
| 2003/0078684 A1 | 4/2003 | Martin et al. |
| 2003/0088322 A1 | 5/2003 | Martin et al. |
| 2003/0149493 A1 | 8/2003 | Blevins et al. |
| 2004/0049295 A1 | 3/2004 | Wojsznis et al. |
| 2004/0049299 A1 | 3/2004 | Wojsznis et al. |
| 2004/0049300 A1 | 3/2004 | Thiele et al. |
| 2004/0059441 A1 | 3/2004 | Martin et al. |
| 2004/0011776 A1 | 6/2004 | Mehta et al. |
| 2004/0107012 A1 | 6/2004 | Das et al. |
| 2004/0107013 A1 | 6/2004 | Fuller et al. |
| 2004/0117040 A1 | 6/2004 | Sayyarrodsari et al. |
| 2004/0117766 A1 * | 6/2004 | Mehta et al. .................. 717/121 |
| 2004/0130276 A1 | 7/2004 | Sayyarrodsari et al. |
| 2004/0162709 A1 | 8/2004 | Das |
| 2004/0210325 A1 | 10/2004 | Martin et al. |
| 2004/0225469 A1 | 11/2004 | Backstrom et al. |
| 2004/0249483 A1 | 12/2004 | Wojsznis et al. |
| 2005/0015421 A1 | 1/2005 | Fuller |
| 2005/0072187 A1 | 4/2005 | Seiver et al. |
| 2005/0075737 A1 | 4/2005 | Martin et al. |
| 2005/0075993 A1 | 4/2005 | Jang et al. |
| 2005/0107895 A1 | 5/2005 | Pistikopoulos et al. |
| 2005/0149208 A1 | 7/2005 | Harmse et al. |
| 2005/0154477 A1 | 7/2005 | Martin et al. |
| 2005/0187643 A1 | 8/2005 | Sayyar-Rodsari et al. |
| 2006/0020352 A1 | 1/2006 | Martin et al. |
| 2006/0045801 A1 | 3/2006 | Boyden et al. |
| 2006/0045802 A1 | 3/2006 | Boyden et al. |
| 2006/0045803 A1 | 3/2006 | Boyden et al. |
| 2006/0045804 A1 | 3/2006 | Boyden et al. |
| 2006/0047366 A1 | 3/2006 | Boyden et al. |
| 2006/0074501 A1 | 4/2006 | Hartman et al. |
| 2006/0100720 A1 | 5/2006 | Martin et al. |
| 2006/0184477 A1 | 8/2006 | Hartman et al. |
| 2006/0224534 A1 | 10/2006 | Hartman et al. |
| 2006/0229743 A1 | 10/2006 | Boe et al. |
| 2006/0241786 A1 | 10/2006 | Boe et al. |
| 2006/0259197 A1 | 11/2006 | Boe et al. |
| 2006/0282178 A1 | 12/2006 | Das et al. |
| 2007/0018982 A1 | 1/2007 | Brooks et al. |
| 2007/0059838 A1 | 3/2007 | Morrison et al. |
| 2007/0078529 A1 | 4/2007 | Thiele et al. |
| 2007/0078530 A1 | 4/2007 | Blevins et al. |
| 2007/0078660 A1 | 4/2007 | Ferris |
| 2007/0088448 A1 | 4/2007 | Mylaraswamy et al. |
| 2007/0093918 A1 | 4/2007 | Blevins et al. |
| 2007/0100476 A1 | 5/2007 | Fan et al. |
| 2007/0112531 A1 | 5/2007 | Zhan et al. |
| 2007/0112905 A1 | 5/2007 | Blevins et al. |
| 2007/0131075 A1 | 6/2007 | Zhang et al. |
| 2007/0198104 A1 | 8/2007 | Sayyarrodsari et al. |
| 2007/0198446 A1 | 8/2007 | Das et al. |
| 2007/0225835 A1 | 9/2007 | Zhu |
| 2007/0244575 A1 | 10/2007 | Wojsznis et al. |
| 2007/0282487 A1 * | 12/2007 | Kirchhof ....................... 700/287 |
| 2008/0047098 A1 | 2/2008 | Nawrocki |
| 2008/0065242 A1 | 3/2008 | Attarwala |
| 2008/0071394 A1 | 3/2008 | Turner et al. |
| 2008/0071397 A1 | 3/2008 | Rawlings et al. |
| 2008/0082180 A1 | 4/2008 | Blevins et al. |
| 2008/0097625 A1 | 4/2008 | Vouzis et al. |
| 2008/0103747 A1 | 5/2008 | Macharia et al. |
| 2008/0104003 A1 | 5/2008 | Macharia et al. |
| 2008/0108048 A1 | 5/2008 | Bartee et al. |
| 2008/0109100 A1 | 5/2008 | Macharia et al. |
| 2008/0109200 A1 | 5/2008 | Bartee et al. |

FOREIGN PATENT DOCUMENTS

| | | |
|---|---|---|
| EP | 1418477 A1 | 5/2004 |
| WO | 2007015078 A1 | 2/2007 |

OTHER PUBLICATIONS

Qin et al., A Survey of Industrial Model Predictive Control Technology' 2002, Univ of Texas at Austin, p. 1-32.*

Bemporad et al., "Model Predictive Control-New Tools for Designing and Evaluation" IEEE 2004, p. 5622-5627.*

"Optimization of Chemical Processes," T. F. Edgar and D. M. Himmelblau, University of Texas, p. 308, p. 2 pages.

"The Lagrange Multiplier is Not the Shadow Value of the Limiting Resource in the Presence of Strategically Interacting Agents," University of Central Florida, May 22, 2007, 7 pages.

"Network Effects, Pricing Strategies, and Optimal Upgrade Time in Software Provision," Utah State University, Apr. 30, 1995, 7 pages.

Soufian, M, et al., "Constrained Multivariable Control and Real Time Distillation Process", cONTROL '96, UKACC International Conference on (Conf. Publ. No. 427), IEE, vol. 1, 1996, pp. 382-387, XP006505654 ISBN: 0-85296-668-7.

PCT Application No. PCT/US2007/020332, International Search Report, Form PCT/ISA/210, dated 2009 Jan. 26, 6 pgs.

PCT Application No. PCT/US2007/020332, Written Opinion of the International Searching Authority, Form PCT/ISA/237, dated 2009 Jan. 26, 11 pgs.

* cited by examiner

MODEL PREDICTIVE CONTROLLER SOLUTION ANALYSIS PROCESS

BACKGROUND OF THE INVENTION

1. Field of the Invention

This invention relates to control systems and, more particularly, to methods of driving dynamic and steady-state behavior of a process toward more optimum operating conditions.

2. Discussion of Related Art

Multivariable predictive control algorithms, such as DMC-plus™ from AspenTech® of Aspen Technologies, Inc. or RMPCT from Honeywell International Inc., are a combination of calculations to drive the dynamic and steady-state behavior of a process toward a more optimum operating condition. The steady-state algorithm used in the control scheme is most commonly a linear program (LP), but sometimes is a quadratic program (QP). For small problems, understanding the LP or QP solution is relatively simple. Two-dimensional problems can be visualized on a paper and demonstrated to an operator to gain understanding of the process. With some detailed modeling background, engineers and well trained operators can understand medium-sized problems (less than 10 dimensions). However, larger, more interactive problems, often require offline simulation. This can take a significant amount of time to understand, even qualitatively.

Typically, an operator of a multivariable predictive controller (MPC) can observe current constraints and may have access to an open loop model of the process. However, to fully understand the constraint set relief, the operator would need a detailed understanding of the process model and the ability to trace independent and dependent relationships through the model. For that, an offline simulation or analysis tool is required. Otherwise, the operator cannot know how much to change a constraint or which constraint is the next to become active.

One concept for an offline simulation uses a matrix pivot in which unconstrained manipulated variables (MVs) are swapped with constrained controlled variables (CV). The constraints become "independents," and the unconstrained variables become "dependents." The matrix pivot can be symbolized as follows:

$$\begin{bmatrix} y_1 \\ y_2 \end{bmatrix} = \begin{bmatrix} A & B \\ C & D \end{bmatrix} \begin{bmatrix} x_1 \\ x_2 \end{bmatrix}$$

$$\begin{bmatrix} x_1 \\ y_2 \end{bmatrix} = \begin{bmatrix} A^{-1} & -A^{-1}B \\ CA^{-1} & D-CA^{-1}B \end{bmatrix} \begin{bmatrix} y_1 \\ x_2 \end{bmatrix}$$

However, this approach does not provide quantitative answers as to how much any operator change will affect the controller solution.

There is a need for a simple utility that can analyze past or current dynamic matrix control (DMC) solutions of any-sized problem, in real-time, to provide an operator meaningful, quantitative instructions for DMC controller constraint relief.

BRIEF SUMMARY OF THE INVENTION

Aspects of embodiments of the invention relate to a method to analyze and describe a solution from an MPC that can provide quantitative input to an operator regarding the effect of changing controller limits in an MPC solution.

Another aspect of embodiments of the invention relates to using the method to provide information that is immediately available, accessible, and understood by operators of the control system.

This invention is directed to a method of analyzing a solution from a multivariable predictive controller, comprising obtaining a solution from a multivariable predictive controller having a steady-state optimizer that results in different variable constraint statuses, wherein the solution includes controlled variables that are predicted from manipulated variables, and operating on the solution to obtain a relationship between constrained variables and unconstrained variables to determine how unconstrained variables respond to changes in constrained variables. The solution can be represented in a matrix.

The invention is also directed to a method of operating a control system for use with a process facility, comprising extracting a raw gain matrix from a base model file, including manipulated variables and controlled variables related to the process, based on a steady-state response between the manipulated variables and the controlled variables. The manipulated variables and controlled variables are classified by an active constraint condition, wherein the classification is based on constrained, unconstrained or violated conditions. The amount of possible movement for each variable is calculated based on the active constraint condition classification. The order of the gain matrix is changed based on the active constraint condition to obtain a model matrix representative of an optimization solution. A result matrix is formed by pivoting the constrained controlled variables with the unconstrained manipulated variables in the model matrix to form the result matrix. The result matrix and the amount of possible movement are used to calculate the response of the unconstrained variables to changes in the constrained variables.

The invention is also directed to a control system for use with a process, comprising a storage device that stores a base model file including manipulated variables and controlled variables related to the process, and a controller associated with the storage device that extracts a raw gain matrix from the base model file based on a steady-state response between the manipulated variables and the controlled variables. The controller uses an optimization solution to describe how unconstrained variables respond to changes in constrained variables by classifying the manipulated variables and controlled variables by an active constraint condition, wherein the classification is based on constrained, unconstrained or violated conditions, calculating the amount of possible movement for each variable based on the active constraint condition classification, changing the order of the gain matrix based on the active constraint condition to obtain a model matrix representative of an optimization solution, predicting controlled variables from the manipulated variables using the model matrix, forming a result matrix by pivoting the constrained controlled variables with the unconstrained manipulated variables in the model matrix to form the result matrix, and using the result matrix and the amount of possible movement to calculate the response of the unconstrained variables to changes in the constrained variables.

These and other aspects of the invention will become apparent when taken in conjunction with the detailed description and appended drawings.

BRIEF DESCRIPTION OF THE DRAWINGS

The invention will now be described in conjunction with the accompanying drawings in which.

DETAILED DESCRIPTION OF PREFERRED EMBODIMENTS

Figure 1:
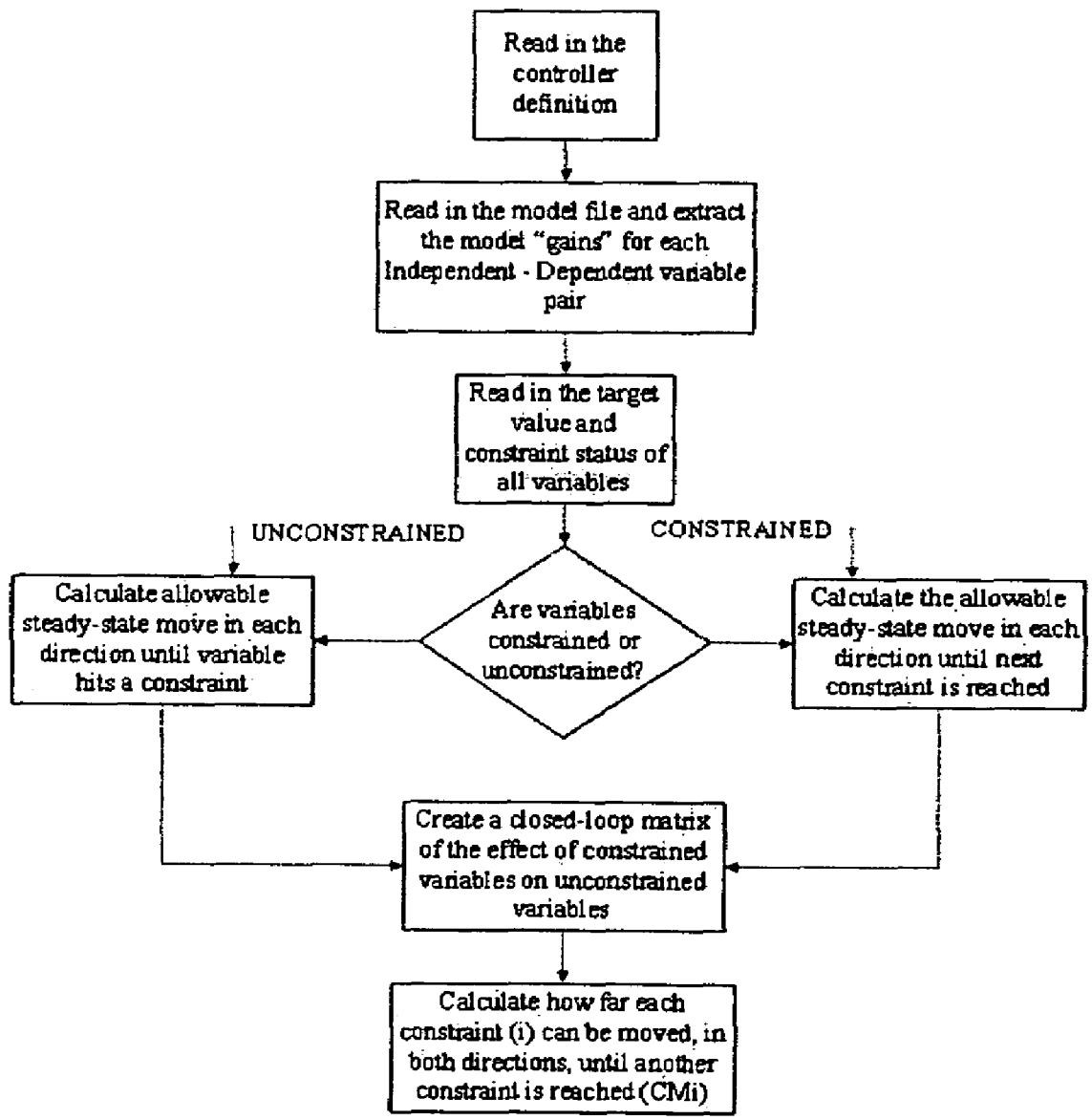
FIG. 1 is a flow chart showing the basic steps of the process in accordance with the invention.

A preferred embodiment of this invention described herein is directed to a dynamic matrix controller (DMC). However, the invention is intended to apply more broadly to multivariable predictive controllers (MPC) in general and to control schemes in which it is desirable to optimize process limits in various applications.

The term operator used herein is intended to refer to any end user. For example, an end user could be an operator, a process engineer, a shift lead, a control engineer, or a manager.

To demonstrate the basic functionality of the invention, a simple problem is addressed. In the simplest form, a constraint sensitivity analysis tool for a DMC controller is provided with no transforms, no ramps, and no minimum move MVs. The basic functions include a constrained variable analysis, which determines how much a constraint can be moved before the next constraint becomes active, and identifies the next constraint. An unconstrained variable analysis is also accomplished, which determines which constraints are causing the controller to move some unconstrained variable (e.g., feed) down (or up) and determines the sensitivity (closed-loop gain) of all active constraints to this variable. An infeasibility analysis is accomplished, which determines which constraint variable(s) can be moved and by how much in order to make the solution become feasible. A test or Excel-based interface will work for analysis results. A graphic user interface (GUI) is effective.

To increase the ability to analyze more complex problems, auto-recognition and calculation of MV and CV transforms are provided and the results are incorporated into the analysis. Additionally, the following capabilities are enabled: the ability to recognize and handle min-move MVs, the ability to recognize and handle ramp variables and ramp-linked relationships, economic prioritization of available constraint-relief mechanism, the ability to handle external targets, the ability to analyze infeasibilities by priority classification, the ability to express the solution with a graphical depiction of loop pairing (unconstrained MV v. constrained CV), and the ability to step through sequential solutions from historical data. This technique will work with composite applications, where one optimization function is used for multiple combined controllers. A GUI and hypertext markup language (HTML) interface is possible.

At the highest level, the tool will also provide the ability to recognize and explain QP objective function, provide the ability to analyze multiple rank groups for relief of infeasibilities, and recognize and incorporate active gain multiplication factors. A link could also be provided to commercial databases, such as AspenWatch from AspenTech® or Process History Database (PHD) from Honeywell International Inc.

More particularly, referring the flow chart of FIG. 1, the process accomplished by this invention begins with providing information to an operator relating to the variables. The first step is to read in the controller definition from a file or database. This provides the number and name of the manipulated, feedforward and controlled variables. Next, read in the model file and extract the model "gains" for each independent (MV or feedforward)—dependent (CV) variable pair. In general, the model is dynamic, so only the steady-state portion of the model (i.e., the gain) is used for this calculation. In a variation of the process, the model may be a linearized relationship between variables in a non-linear controller. The model may also be a linearized relationship between variables in a real-time optimization problem.

An example of the steady-state response between MVs and CVs in a 4MV X 7 CV matrix is shown below.

|        | $CV_1$   | $CV_2$   | $CV_3$   | $CV_4$   | $CV_5$   | $CV_6$   | $CV_7$   |
|--------|----------|----------|----------|----------|----------|----------|----------|
| $MV_1$ | $G_{11}$ | $G_{12}$ | $G_{13}$ | $G_{14}$ | $G_{15}$ | $G_{16}$ | $G_{17}$ |
| $MV_2$ | $G_{21}$ | $G_{22}$ | $G_{23}$ | $G_{24}$ | $G_{25}$ | $G_{26}$ | $G_{27}$ |
| $MV_3$ | $G_{31}$ | $G_{32}$ | $G_{33}$ | $G_{34}$ | $G_{35}$ | $G_{36}$ | $G_{37}$ |
| $MV_4$ | $G_{41}$ | $G_{42}$ | $G_{43}$ | $G_{44}$ | $G_{45}$ | $G_{46}$ | $G_{47}$ |

The target value and constraint status of all variables are read in, and the variables are classified as either constrained or unconstrained. Violated variables are classified as unconstrained and inactive manipulated variables are classified as constrained. The data should be consistent, i.e., all from the same execution cycle. The status can be read from a file or from a computer database. The data can be from current or historical controller executions.

For each variable, the allowable steady-state move (AM) is calculated in each direction until the next constraint is reached. This calculation is accomplished for all variables. The calculation varies based on the type of active constraint indication.

For unconstrained variables, the delta represents the change until the variable hits a constraint. For example, an unconstrained variable is between the operator high and operator low limits. The allowable move up (AM up) equals the operator high limit (OPHIGH) minus the steady-state target. This can be represented by:

$AM$ up=$OP$HIGH–Steady-State Target.

The allowable move down (AM down) equals the steady-state target minus the operator low limit (OPLO). This can be represented by:

$AM$ down=Steady-State Target–$OP$LO.

For violated variables, the delta is calculated as the amount of change until the variable becomes feasible. For example, if the variable exceeds the operator high limit, $AM$ down=Steady-State Target–$OP$HIGH.

For constrained variables, the delta represents the change until the next constraint is reached. For example, if the engineering limit (Engineering Hi) is the next limit beyond the operating limit, then for a variable constrained at the operator high limit, $AM$ up=Engineering Hi–$OP$HIGH.

In calculating the allowable steady-state move, it is possible that single variables will have multiple sets of limits, including for example, operator, engineer, equipment, safety, range, etc. The user can select or deselect which limits to consider for calculating the allowable change. For example, the user may deselect the engineering limit and use the range of the measurement to calculate the allowable move.

The next step is to create a closed-loop matrix of the effect of the constrained variables on unconstrained variables (instead of MVs to CVs.) For each unconstrained/violated variable, the constrained variables that affect it are displayed. These are constraints that have a non-zero matrix element to the chosen unconstrained variable. This can be accomplished by changing the order of the gain matrix depending on constraint condition. Unconstrained MVs are moved to the top, and constrained CVs are moved to the left. The resulting matrix is composed of four sections, including:
 (a) model of unconstrained MVs to constrained CVs;
 (b) model of constrained Mvs to constrained CVs;
 (c) model of unconstrained MVs to unconstrained CVs; and
 (d) model of constrained MVs to unconstrained CVs.

The model matrix can be displayed symbolically as:

|        | $CV_C$ | $CV_U$ |
|--------|--------|--------|
| $MV_U$ | A      | C      |
| $MV_C$ | B      | D      |

Algebraically, the CVs are predicted from the MV models.

$$CV_C = A*MV_U + B*MV_C$$

$$CV_U = C*MV_U + D*MV_C$$

In matrix form, the relationship appears as follows:

$$\begin{bmatrix} CV_C \\ CV_U \end{bmatrix} = \begin{bmatrix} A & B \\ C & D \end{bmatrix} \begin{bmatrix} MV_U \\ MV_C \end{bmatrix}$$

If the equations are scalar, it would represent two equations with two unknowns, and the knowns and unknowns could be swapped. The same equations can be matrix form, to swap or pivot the constrained CVs with the unconstrained MVs as $$\begin{bmatrix} MV_U \\ CV_U \end{bmatrix} = \begin{bmatrix} A^{-1} & A^{-1}B \\ CA^{-1} & D - CA^{-1}B \end{bmatrix} \begin{bmatrix} CV_C \\ MV_C \end{bmatrix}$$

Qualitatively, the resulting equation and matrix show how unconstrained variables respond to changes in constrained variables, as seen below.

|        | $MV_U$      | $CV_U$ |
|--------|-------------|--------|
| $CV_C$ | $G_{Pivot}$ | ...    |
| $MV_C$ | ...         | ...    |

This example matrix is pivoted to show the form where $MV_3$, $MV_4$, $CV_2$, and $CV_6$ constrained.

|        | $CV_1$    | $MV_1$    | $CV_3$    | $CV_4$    | $CV_5$    | $MV_2$    | $CV_7$    |
|--------|-----------|-----------|-----------|-----------|-----------|-----------|-----------|
| $CV_2$ | $GP_{11}$ | $GP_{12}$ | $GP_{13}$ | $GP_{14}$ | $GP_{15}$ | $GP_{16}$ | $GP_{17}$ |
| $CV_6$ | $GP_{21}$ | $GP_{22}$ | $GP_{23}$ | $GP_{24}$ | $GP_{25}$ | $GP_{26}$ | $GP_{27}$ |
| $MV_3$ | $GP_{31}$ | $GP_{32}$ | $GP_{33}$ | $GP_{34}$ | $GP_{35}$ | $GP_{36}$ | $GP_{37}$ |
| $MV_4$ | $GP_{41}$ | $GP_{42}$ | $GP_{43}$ | $GP_{44}$ | $GP_{45}$ | $GP_{46}$ | $GP_{47}$ |

Each element in this matrix represents the amount of change in an unconstrained variable for a unity change in the constrained variables. Matrix elements that are very close to zero are counted as zero.

An alternate way to create the closed-loop matrix is to simulate the controller and perturb each of the constraints, one at a time, by a small amount, ϵ. The ratio of the change or unconstrained variable to ϵ for each constrained-unconstrained variable pair is the gain in the closed-loop matrix.

The result is that for each unconstrained/violated variable, the constrained variables that affect it are displayed. The information in this closed-loop matrix is then used to calculate all of the information regarding the three general classes of information, which relate to constrained variables, unconstrained variables, and violated variables described above, to the operators.

For each constraint i, the process can calculate how far it can be moved, in both directions, until another constraint is reached (CMi). The amount of move and the next constraint are recorded and displayed for the operator's use. In particular, the minimum of allowable move (AM) for the constraint i and the ratio of allowable move of unconstrained variable j (AMj)/closed-loop gain GPij can be found. Using this calculation, it is important to use the correct sign. For example, if calculating how far a constraint can be moved up, the allowable move of unconstrained variable down should be used if the gain element is negative.

It is also possible to calculate the value of limit relaxation of each constraint. This value is calculated by multiplying the shadow value of the constraint, which is usually a result from the calculation itself, by CM, the move until the next constraint. It is also possible to use a shadow value from another program, such as planning and scheduling or real-time optimization, in place of the shadow value from the controller optimization.

Solutions to the following objectives can be obtained from using this tool.

For constraint analysis, answers to the following questions can be determined.

How much can a constraint be changed before another constraint becomes active?
 What is the next active constraint?

For unconstrained variable analysis, answers to the following questions can be determined.

If it is desired to increase or decrease the variable, which constraints effect the change?
 What is the sensitivity (closed loop gain) of those constraints?
 What is the priority of the constraints based on the magnitude of possible effects, or the cost to the overall LP optimization objective function?

For infeasibility analysis, answers to the following questions can be determined.

Which variables can be changed, and by how much, for the solution to become feasible?

It can be appreciated that this invention provides quantitative input to operators and engineers regarding the effect of changing controller limits on the MPC controller solution. Prior to this invention, information on constraint dependencies and relief mechanisms was only available to engineers by doing multiple offline MPC simulations. Having this information immediately available, accessible and understandable by all operators allows a rapid response to changes and hence a more optimal process operation.

Various modifications can be made in our invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A method of analyzing a solution from a multivariable predictive controller, comprising:
   obtaining a solution from a multivariable predictive controller having a steady-state optimizer that results in different variable constraint statuses, wherein the solution includes controlled variables that are predicted from manipulated variables; and
   operating on the solution to obtain a relationship between constrained variables and unconstrained variables to determine how unconstrained variables respond to changes in constrained variables; and
   for each constrained variable, determining how far it can be moved until a next constraint is reached; and
   using the relationship between the constrained and unconstrained variables to determine an amount of change needed to move a constraint for a violated variable such that the violated variable is no longer constrained into feasibility.

2. The method of claim 1, wherein the solution is represented in a matrix and operating on the solution includes pivoting the constrained controlled variables with the unconstrained manipulated variables in the matrix.

3. The method of claim 1, wherein the solution is represented in a matrix formed by simulating the multivariable predictive controller and perturbing each constraint a predetermined amount, wherein a ratio of a change of unconstrained variable to the predetermined amount is defined as a gain for each constrained and unconstrained variable pair.

4. The method of claim 1, further comprising using the relationship between the constrained and unconstrained variables to calculate an amount of change needed in a constrained variable to reach a next constraint in an unconstrained or a constrained variable.

5. The method of claim 4, further comprising determining a set of limits for each variable and selecting a limit to use for calculating the amount of change.

6. The method of claim 1, further comprising using the relationship between the constrained and unconstrained variables to determine how much change in a constraint affects an unconstrained variable.

7. A method of operating a control system for use with a process facility, comprising:
   extracting a raw gain matrix from a base model file, including manipulated variables and controlled variables related to the process, based on a steady-state response between the manipulated variables and the controlled variables;
   classifying the manipulated variables and controlled variables by an active constraint condition, wherein the classification is based on constrained, unconstrained or violated conditions;
   calculating an amount of possible movement for each variable based on the active constraint condition classification;
   wherein calculating the amount of possible movement for a constrained variable includes determining which constraint condition will be reached next;
   wherein calculating the amount of possible movement for an unconstrained variable results in an operator high limit, an operator low limit or a step limit;
   changing the order of the gain matrix based on the active constraint condition classification to obtain a model matrix representative of an optimization solution;
   forming a result matrix by pivoting the constrained controlled variables with the unconstrained manipulated variables in the model matrix to form the result matrix; and,
   using the result matrix and the amount of possible movement to calculate the response of the unconstrained variables to changes in the constrained variables.

8. The method of claim 7, wherein each variable has a set of limits and calculating the amount of possible movement includes selecting a limit from the set of limits to use in the calculation.

9. The method of claim 7, wherein changing the order of the gain matrix includes moving unconstrained manipulated variables to the top of gain matrix and constrained controlled variables to the left of gain matrix.

10. The method of claim 7, wherein changing the order of the gain matrix results in a matrix having (i) a model of unconstrained manipulated variables to constrained controlled variables, (ii) a model of constrained manipulated variables to constrained controlled variables, (iii) a model of unconstrained manipulated variables to unconstrained controlled variables, and (iv) a model of constrained manipulated variables to unconstrained controlled variables.

11. The method of claim 7, wherein using the result matrix includes determining how far a constrained variable can be changed before a next constraint is reached.

12. The method of claim 7, wherein using the result matrix includes determining all constrained variables that affect each unconstrained variable.

13. The method of claim 7, wherein using the result matrix includes determining how much a change in each constraint affects an associated unconstrained variable.

14. The method of claim 7, wherein using the result matrix includes calculating movement required to achieve feasibility for each constraint.

15. A control system for use with a process, comprising:
   a storage device that stores a base model file including manipulated variables and controlled variables related to the process; and
   a controller associated with the storage device that extracts a raw gain matrix from the base model file based on a steady-state response between the manipulated variables and the controlled variables, wherein the controller uses an optimization solution to describe how unconstrained variables respond to changes in constrained variables by
   classifying the manipulated variables and controlled variables by an active constraint condition, wherein the classification is based on constrained, unconstrained or violated conditions,
   calculating an amount of possible movement for each variable based on the active constraint condition classification,
   wherein the controller calculates the amount of possible movement for a violated variable by determining what movement will return the variable to a limit;
   changing the order of the raw gain matrix based on the active constraint condition to obtain a model matrix representative of an optimization solution,
   forming a result matrix by pivoting the constrained controlled variables with the unconstrained manipulated variables in the model matrix to form the result matrix, and
   using the result matrix and the amount of possible movement to calculate the response of the unconstrained variables to changes in the constrained variables.

16. The control system of claim 15, wherein the controller calculates the amount of possible movement for an unconstrained variable by evaluating possible change in a result of an optimization function.

17. The control system of claim 16, wherein the result of the optimization function is an operator high limit, an operator low limit or a step limit.

18. The control system of claim 15, wherein the controller changes the order of the gain matrix by moving unconstrained manipulated variables to the top of the matrix and constrained controlled variables to the left of the matrix.

19. The control system of claim 15, wherein the controller changes the order of the gain matrix to result in a matrix having (i) a model of unconstrained manipulated variables to constrained controlled variables, (ii) a model of constrained manipulated variables to constrained controlled variables, (iii) a model of unconstrained manipulated variables to unconstrained controlled variables, and (iv) a model of constrained manipulated variables to unconstrained controlled variables.

20. The control system of claim 15, wherein the controller determines how far a constrained variable can be changed before another constraint is reached by using the result matrix.

21. The control system of claim 15, wherein the controller determines all constrained variables that affect each unconstrained variable by using the result matrix.

22. The control system of claim 15, wherein the controller determines how much a change in each constraint affects an associated unconstrained variable by using the result matrix.

23. The control system of claim 15, wherein the controller calculates movement required to achieve a non-violated variable for each constraint by using the result matrix.

24. A method of operating a control system for use with a process facility, comprising:
    extracting a raw gain matrix from a base model file, including manipulated variables and controlled variables related to the process, based on a steady-state response between the manipulated variables and the controlled variables;
    classifying the manipulated variables and controlled variables by an active constraint condition, wherein the classification is based on constrained, unconstrained or violated conditions;
    calculating an amount of possible movement for each variable based on the active constraint condition classification;
    wherein calculating the amount of possible movement for a constrained variable includes determining which constraint condition will be reached next;
    wherein calculating the amount of possible movement for a violated variable includes determining what movement will return the variable to a limit;
    changing the order of the raw gain matrix based on the active constraint condition to obtain a model matrix representative of an optimization solution;
    forming a result matrix by pivoting the constrained controlled variables with the unconstrained manipulated variables in the model matrix to form the result matrix; and,
    using the result matrix and the amount of possible movement to calculate the response of the unconstrained variables to changes in the constrained variables.

25. The method of claim 24, wherein calculating the amount of possible movement for an unconstrained variable results in an operator high limit, and operator low limit or a step limit.

26. The method of claim 24, wherein each variable has a set of limits and calculating the amount of possible movement includes selecting a limit from the set of limits to use in the calculation.

27. The method of claim 24, wherein changing the order of the gain matrix includes moving unconstrained manipulated variables to the top of the gain matrix and constrained controlled variables to the left of the gain matrix.

28. The method of claim 24, wherein changing the order of the gain matrix results in a matrix having (i) a model of unconstrained manipulated variables to constrained controlled variables, (ii) a model of constrained manipulated variables to constrained controlled variables, (iii) a model of unconstrained manipulated variables to unconstrained controlled variables, and (iv) a model of constrained manipulated variables to unconstrained controlled variables.

29. The method of claim 24, wherein using the result matrix includes determining how far a constrained variable can be changed before a next constraint is reached.

30. The method of claim 24, wherein using the result matrix includes determining all constrained variables that affect each unconstrained variable.

31. The method of claim 24, wherein using the result matrix includes determining how much a change in each constraint affects an associated unconstrained variable.

* * * * *